United States Patent

Shigematsu et al.

[11] 4,389,992
[45] Jun. 28, 1983

[54] IGNITION TIMING CONTROL METHOD AND SYSTEM THEREFOR

[75] Inventors: Takashi Shigematsu; Tomoyuki Watanabe, both of Shizuoka, Japan

[73] Assignee: Toyota Jidosha Kogyo Kabushiki Kaisha, Toyota, Japan

[21] Appl. No.: 235,724

[22] Filed: Feb. 18, 1981

[30] Foreign Application Priority Data

Feb. 19, 1980 [JP] Japan .................................. 55-19590

[51] Int. Cl.³ .......................... B60K 27/06; F02P 5/14; G01L 23/22; F02P 5/04
[52] U.S. Cl. .................................. 123/419; 123/422; 123/415
[58] Field of Search ............... 123/426, 414, 415, 419, 123/425, 422; 60/105

[56] References Cited

U.S. PATENT DOCUMENTS

| | | | |
|---|---|---|---|
| 3,142,967 | 8/1964 | Schweitzer | 60/105 |
| 4,012,942 | 3/1977 | Horned | 123/425 |
| 4,236,491 | 12/1980 | Hottori et al. | 123/425 |
| 4,257,364 | 3/1981 | Sawada et al. | 123/425 |
| 4,257,373 | 3/1981 | McDougal et al. | 123/426 |
| 4,276,861 | 7/1981 | Kearney et al. | 123/425 |
| 4,282,841 | 8/1981 | Takagi et al. | 123/425 |
| 4,300,503 | 11/1981 | DeLeris et al. | 123/419 |
| 4,331,117 | 5/1982 | Ginsburgh | 123/425 |

FOREIGN PATENT DOCUMENTS 2546705  5/1976  Fed. Rep. of Germany ...... 123/419

Primary Examiner—Raymond A. Nelli
Attorney, Agent, or Firm—Cushman, Darby & Cushman

[57] ABSTRACT

The ignition timing of an engine is changed by a predetermined value to cause fluctuations in torque to an output shaft of the engine. Vibrations caused by the fluctuations in torque to an engine block are detected and the ignition timing is controlled so that the vibrations can be reduced to the minimum. Thus, the ignition timing of the engine can be controlled to the optimum condition so that the engine can be operated at the highest condition at all times.

7 Claims, 6 Drawing Figures

IGNITION TIMING CONTROL METHOD AND SYSTEM THEREFOR

BACKGROUND OF THE INVENTION

1. Field of the Invention

The present invention relates to ignition timing control methods and systems therefor in an engine, and particularly to improvements in an ignition timing control method and a system therefor suitable for a spark ignition engine (hereinafter referred to as an "engine") mounted on a motor car, wherein ignition timing can be constantly controlled to the optimum condition in accordance with the operating conditions of the engine.

2. Description of the Prior Art

In general, ignition timing of an engine has a considerable influence on the output, fuel consumption performance and the like of the engine. Consequently, heretofore, the ignition timing of the engines has been controlled such that the operating conditions of the engine, such as the number of rotation, intake negative pressure and the like, are detected so as to effect the ignition at the preset optimum ignition timing in accordance to the values thus detected. Furthermore, as for other control factors, such as an exhaust gas recirculation rate, cooling water temperature and the like, the ignition timing is changed in accordance with the values of those control factors to correct the ignition timing to the optimum. However, according to the abovedescribed method, influences from the atmospheric pressure, ambient temperature, humidity and the like cannot be corrected, and moreover, a multiplicity of sensors are required to detect all of the factors for correction. Further, even factors not readily detectable, such as aging of the engine due to mechanical wear, variation in fuel quality and the like vary the optimum ignition timing required, and, for those factors, control to the optimum ignition timing has been difficult by the conventional ignition timing control method. Consequently, it has been the common practice to be prepared for losses in fuel consumption and output of the engine for disturbances uncontrollable. For example, FIG. 1 shows the relationship between the humidity and the optimum ignition timing, in which, depending on the ambient conditions when the engine is used, the optimum ignition timing has varied through 7° to 8° by a crank angle, thus resulting in deteriorated performance to a considerable extent. Furthermore, as for the variation in ignition timing due to the aging with time and the like, it has been expected that the optimum ignition timing is variable through 15° to 20° by the crank angle at the largest to the ignition timing preset in accordance with the initial operating condition of the engine and the standard atmospheric condition, thus resulting in 10 to 20% of fuel consumption loss. However, heretofore, this loss could not be decreased or eliminated.

On the other hand, as described in U.S. Pat. No. 3,142,967, such an invention analogous to the present invention has been proposed that the fluctuations in torque are detected from an output of an alternator or an acceleration of the rotation of the engine to thereby feedback control the ignition timing. However, this proposal presents such disadvantages that a complicated arrangement is required for a sensor for detecting the torque fluctuations from the alternator or an output shaft of the engine, and reliability is low.

SUMMARY OF THE INVENTION

The present invention has been developed to obviate the abovedescribed disadvantages of the prior art and has as its object the provision of an ignition timing control method and a system therefor in an engine, wherein, without using a sensor having a complicated arrangement, even if the optimum ignition timing required is varied due to the change in the ambient conditions of the engine and unknown fluctuating factors such as aging of the engine, such an ignition timing can be automatically set that the performance of the engine is constantly obtainable at the optimum condition.

According to the present invention, in the ignition timing control method of the engine, the ignition timing of the engine is changed by a predetermined value in the proximity of the preset ignition timing to generate torque fluctuations in the output shaft, vibrations of the engine block caused by the torque fluctuations, and the preset ignition timing is feedback controlled so that the vibrations can be at the minimum, thereby enabling to achieve the abovedescribed object.

Furthermore, the ignition timing control system in the engine includes:

ignition timing changing means for advancing or delaying the ignition timing of the engine by a predetermined value by a proper cycle in the vicinity of a preset ignition timing;

engine vibration detecting means for detecting vibrations of an engine block generated by oscillations of rotation about an output shaft;

vibration increase-decrease discriminating means for discriminating increase or decrease in the amplitude of vibrations of the engine corresponding to an ignition timing change from a cycle component of an amplitude corresponding to an ignition timing change cycle in an output from said engine vibration detecting means; and ignition timing control means for changing said preset ignition timing in a direction of decrease in the engine vibrations by an output from said vibration increase-decrease discriminating means; thereby enabling to achieve the abovedescribed object.

BRIEF DESCRIPTION OF THE DRAWINGS

The abovementioned features and object of the present invention will become more apparent by reference to the following description taken in conjunction with the accompanying drawings, wherein like referenced numerals denote like elements, and in which.

DETAILED DESCRIPTION OF THE INVENTION

Detailed description will hereunder be given of an embodiment of the present invention with reference to the drawings.

Figure 1:
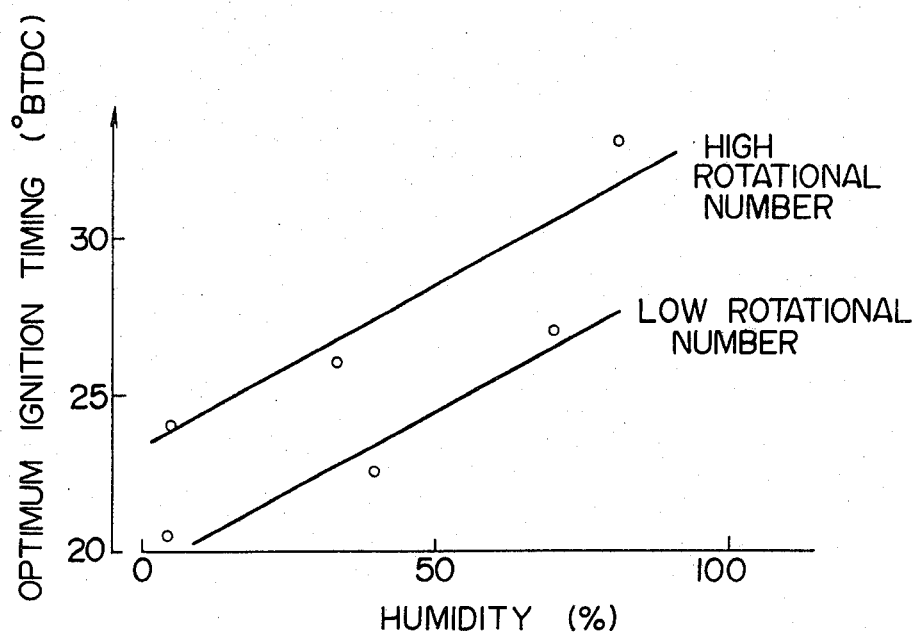
FIG. 1 is a chart showing the relationship between the ambient condition (humidity) and the optimum ignition timing.
Figure 2:
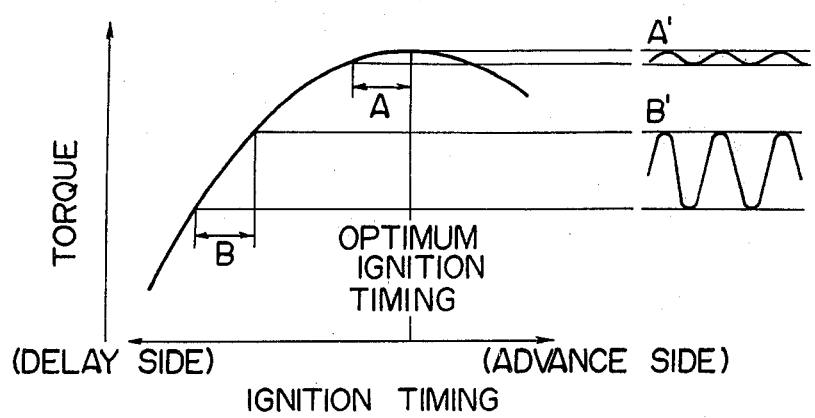
FIG. 2 is a chart showing the principle of the present invention, in which the relationship between the ignition timing and the torque of the output shaft is illustrated.
Figure 3:
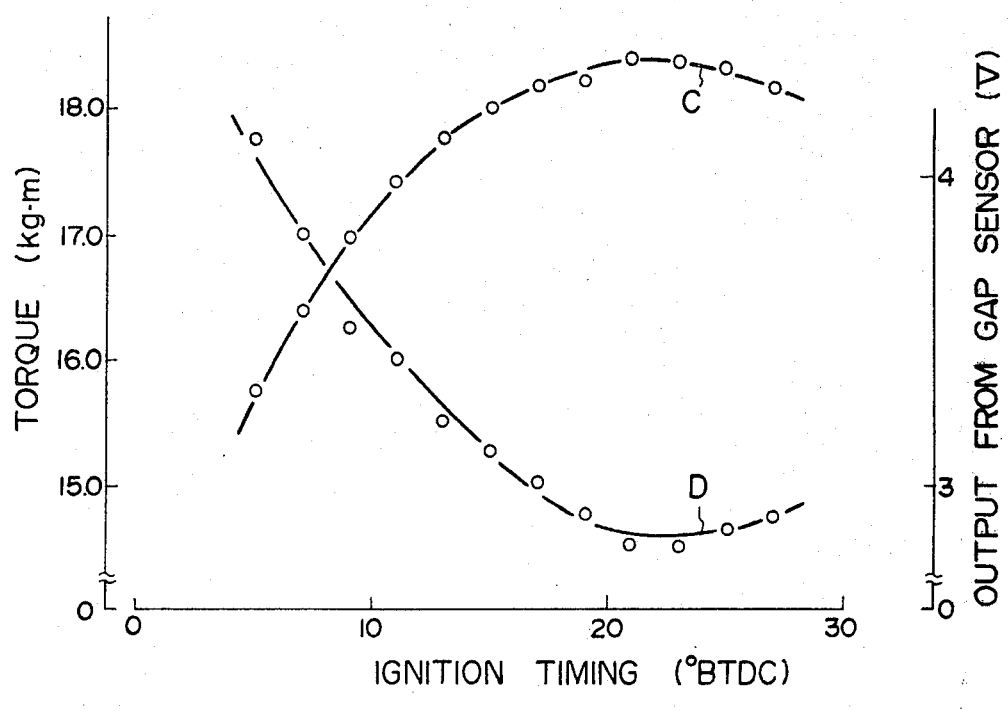
FIG. 3 is a chart also showing the principle of the present invention, in which the relationship between the ignition timing, the torque and the displacement of vibrations of the engine block.

As shown in FIG. 2, the present invention is based on that the variation values of torque (A' or B') are different either in the case the ignition timing is changed in the vicinity of the optimum ignition timing (A) or in the case the ignition timing is changed at a position apart from the optimum ignition timing (B). Consequently, when the ignition timing is changed by a predetermined value, if a point where the torque fluctuations are at the minimum is detected, then the point is the optimum ignition timing, and further, that as shown in FIG. 3, there is a close interrelation between the torque (solid line C) of the output shaft and an output from a gap sensor (solid line D), for example, which detects the displacement of the vibrations of the engine block caused by the vibrations of the rotation about the output shaft, so that the torque fluctuations can be detected from the vibrations of the engine block detected by the gap sensor or the like.

Figure 4:
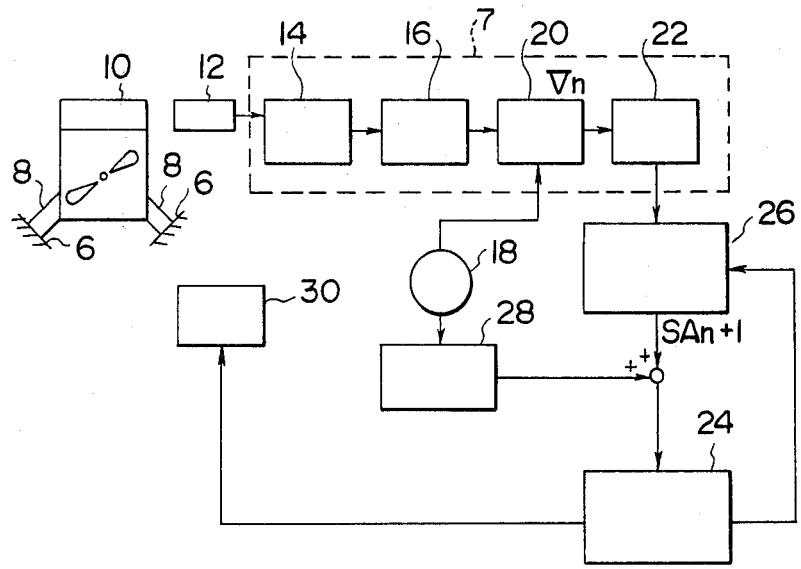
FIG. 4 is a block diagram showing the general arrangement of the ignition timing control system of the engine embodying the present invention.

As shown in FIG. 4, this embodiment includes:

a gap sensor 12 disposed close to an engine block 10 supported on a vehicle body 6 through rubber vibration insulators 8 or the like for detecting the displacement of vibrations of the engine block 10 caused by the vibrations of the rotation about an output shaft;

a filter 14 having a narrow band for extracting only necessary frequencies, such as signals in the proximity of 1Hz, from the output of the gap sensor 12;

a waveshape processing circuit 16 for supplying the mean value or maximum value of the output of the filter 14;

an oscillator 18 for oscillating periodic signals of about 1Hz, which is different from disturbances of the vibrations of the vehicle and the like normally being 3Hz, so as to change the ignition timing of the engine;

a sample hold circuit 20 for performing sampling of the signal values obtained by the waveshape processing circuit 16 along the cycle of the output from the oscillator 18;

a vibration increase-decrease discriminating circuit 22 for discriminating increase or decrease in the amplitude of vibrations of the engine block 10 by storing and comparing a sample value of the output from the sample hold circuit 20;

an ignition timing setting circuit 26 for carrying out calculation of the preset ignition timing from a determining signal supplied by the vibrations increase-decrease discriminating circuit 22 and a signal supplied by the ignition timing control circuit 24;

an ignition timing changing circuit 28 for receiving an output from the oscillator 18 to emit a signal to advance or delay the ignition timing from the center of the preset ignition timing by ±1.5° by the crank angle for example;

an ignition timing control circuit 24 for receiving output signals from the ignition timing setting circuit 26 and the ignition timing changing circuit 28 to control an ignitor 30, thereby controlling the actual ignition timing; and the ignitor 30 having a switching circuit for ON-OFF operating a primary current of an ignition coil in response to an output signal from the ignition timing control circuit 24.

Figure 5:
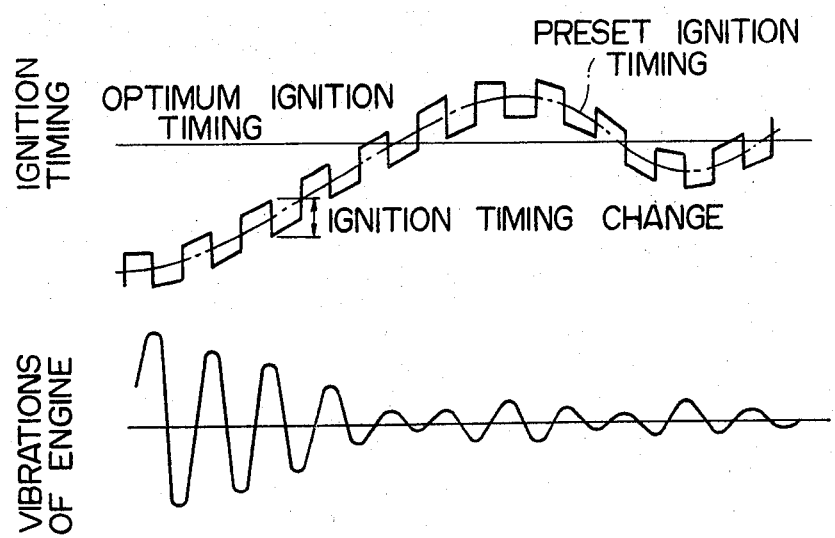
FIG. 5 is a chart showing the relationship between the vibrations of the engine and the ignition timing change.

Description will now be given of action in the general arrangement. Firstly, to extract the influence due to the ignition timing change from an output signal of the gap sensor 12, the output signal supplied through the filter 14 to the waveshape processing circuit 16 where its mean value or waveshape peak value is formed as a factor used for control. More specifically, the signal is full-wave rectified, integrated by a certain constant or subjected to peak holding within a certain period of time. The signal obtained by this processing is brought into synchronism with the ignition timing change controlled by the oscillator 18 and, its typical value, by which increase or decrease in the vibrations of the engine is to be evaluated, is sampled in the sample hold circuit 20. The preset ignition timing should be controlled so that the value sampled can be at the minimum value as shown in FIG. 5. As one method of control, the preset ignition timing $SA_{n+1}$ is from the sample value $V_n$ in the sample hold circuit 20 by:

$$SA_{n+1} = SA_n - \alpha \, \text{sign}(SA_n - SA_{n-1}) \times (V_n - V_{n-1}) \qquad (1)$$

where the suffixes represent the sequence of control, sign ( ) is a plus or minus sign determined by the value in ( ) and $\alpha$ a constant determined by the torque fluctuations, gap sensor and the like.

When control is effected in accordance with the equation (1), the preset ignition timing $SA_{n+1}$ is controlled so that the sample value $V_n$ can be at the minimum value. Then, $(V_n - V_{n-1})$ is carried out in calculation from the output from the sample hold circuit 20 in the vibration increase-decrease discriminating circuit 22, and the result is fed to the ignition timing setting circuit 26. In the ignition timing setting circuit 26, sign $(SA_n - SA_{n-1})$ is determined based on the result described above and an actual signal from the ignition timing control circuit 24, and the result according to the abovedescribed equation (1) is emitted. In response to an output from the ignition setting circuit 26 and an output from the ignition timing changing circuit 28 for emitting a signal for changing the ignition timing, the ignition timing control circuit 24 controls the ignitor 30 so that the ignition timing is changed through ±1.5° from the center of the preset ignition timing $SA_{n+1}$ for example.

Figure 6:
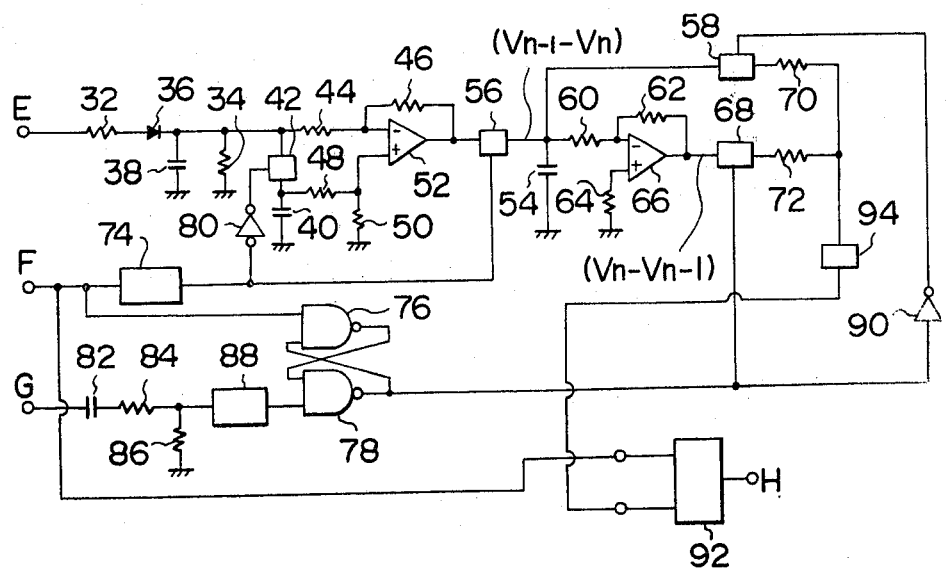
FIG. 6 is an electric circuit diagram showing a specific example of the essential portion in the abovedescribed embodiment.

FIG. 6 shows a specific example of the essential portions of the present invention. Referring to the drawing, a terminal E is the terminal, to which an output from the filter 14 is fed, a terminal F is the terminal to which an output from the oscillator 18 is fed, a terminal G is the terminal, to which a feedback signal is fed from the ignition timing control circuit 24, and a terminal H is the terminal which feeds a control signal for the preset ignition timing. However, if a signal including a component of change from the ignition timing change circuit 28 is fed to the terminal G, then a differentiation circuit to be described hereinafter mulfunctions. Consequently, here, a signal from the terminal H is fed to the terminal G. Connected to the terminal E is a waveshape rectification-integration circuit including resistances 32, 34, a diode 36 and a capacitor 38, and further connected thereto is an analog switch 42 for causing a capacitor 40 to hold an output from the waveshape rectification-integration circuit. Connected to the analog switch 42 and the condensor 40 is a differential amplification circuit including resistances 44, 46, 48, 50 and an operational amplifier 52, so as to differential-amplify the value held by the capacitor 40 and the value from the integration circuit. Furthermore, an analog switch 56 for causing the capacitor 54 to hold an output from the differential amplification circuit is connected to the output side of the differential amplification circuit, an inverting amplifier including an analog switch 58, resistances 60, 62, 64 and an operational amplifier 56 is connected to the output side of the capacitor 54, and an analog switch 68 is connected to the output side of this inverting amplifier. Outputs from the analog switches 58, 68 are combined into one via resistances 70, 72, respectively, and connected to an updown counter 92 through a logic level conversion circuit 94. Further, an output from the updown counter 92 is connected to the terminal H.

Connected to the terminal F is one of the input terminals of a flipflop including a monostable circuit 74, a clock terminal of the updown counter 92 and two NAND gates 76, 78 and an output from the monostable circuit 74 is directly connected to a control terminal of the analog switch 56, and further, connected to a control terminal of the analog switch 42 through two inversion circuits 80.

Connected to the terminal G is a differentiation circuit including a capacitor 82 and resistances 84, 86, and an output from this differentiation circuit is connected to a monostable circuit 88. An output from this monostable circuit 88 is directly connected to a control terminal of the analog switch 68 through the flipflop including the NAND gates 76, 78, and further, connected to a control terminal of the analog switch 58 through an inversion circuit 90.

Description will now be given of action of this circuit. The signals of vibrations of the engine fed to the terminal E are half-wave rectified and integrated by the waveshape rectification-integration circuit. In the operational amplifier 52, to obtain $(V_n - V_{n-1})$ in the aforesaid equation (1), the difference is taken between the signal value $V_n$ at the present time and the value $V_{n-1}$ held by the capacitor 40. To bring the timing, at which the voltage value is held by the capacitor 40, in synchronism with the timing, at which the ignition timing is changed, the monostable circuit 74 is actuated by a fall of a signal from the terminal F, the analog switch 42 is turned 'ON' by an output signal from the monostable circuit 74 to charge the capacitor 40. An output from the operational amplifier 52 is charged to the capacitor 54, the timing of which is required to be earlier than the timing of charging to the capacitor 40, and hence, the latter timing is delayed, though slightly, by means of two inversion circuits 80. Whether the value $(V_n - V_{n-1})$ held by the capacitor 54 or the value $(V_n - V_{n-1})$ passed through the operational amplifier 66 for inverting the sign of plus or minus is fed to a logic level conversion circuit 94 is determined by sign $(SA_n - SA_{n-1})$, and, the switching is effected by the analog switches 58, 68. More specifically, to discriminate sign $(SA_n - SA_{n-1})$, a signal applied to the terminal G for controlling the ignition timing by its voltage is differentiated, the sign of plus or minus thereof is discriminated by the monostable circuit 88, and only the signal having the sign of plus is emitted for example. A flipflop is actuated by this signal and a signal for changing the ignition timing from the terminal F to select an ignition timing changing cycle when sign $(SA_n - SA_{n-1})$ has the sign of plus. This signal is fed to the control terminals of the analog switches 58, 68, whereby $-\text{sign}(SA_n - SA_{n-1}) \times (V_n - V_{n-1})$ is fed to the logic level conversion circuit 94. In the logic level conversion circuit 94, this output voltage is converted to a signal in a manner to convert a positive voltage to 1 level, and a zero and negative voltage to 0 level. In the updown counter 92, when a signal of 1 level is emitted from the logic level conversion circuit 94, the signal upcounts in synchronism with the timing for changing the ignition timing, or when a signal of 0 level is emitted from the logic level conversion circuit 94, the signal downcounts is synchronism with the timing for changing the ignition timing.

In addition, in the abovedescribed embodiment, the vibrations of the engine block are detected through the displacement thereof by use of the gap sensor. It should be understood, however, that there is no limitation to limit the means for detecting the vibrations of the engine block to this specific form disclosed, but on the contrary the invention is to cover all modifications such as an acceleration sensor for sensing the acceleration or a speed sensor for detecting the speed.

Furthermore, in the abovedescribed embodiment, the ignition timing is advanced or delayed through $\pm 1.5°$ from the center of the preset ignition timing. However, the value of change and the method of change of the ignition timing are not limited to these as far as the difference in torque can be detected, and, for example, the ignition timing may be delayed through $+3°$ from the present ignition timing as the upper limit.

As has been described hereinabove, the present invention can offer such outstanding advantages that, without using a sensor having a complicated arrangement, a shift from the optimum ignition timing due to the ambient conditions of the engine, aging and the like can be reliably corrected and the engine can be constantly operated at the best conditions.

From the foregoing description, it should be apparent to one skilled in the art that the abovedescribed embodiment is but one of many possible specific embodiments which can represent the applications of the principles of the present invention. Numerous and varied other arrangements can be readily devised by those skilled in the art without departing from the spirit and scope of the invention.

What is claimed is:

1. An ignition timing control method in an internal combustion engine, comprising:
    alternately advancing and delaying an ignition timing from a reference ignition timing at a predetermined frequency, to thereby vibrate the engine;
    detecting an amplitude of the engine vibrations substantially at said predetermined frequency; and
    adjusting said reference ignition timing so that said amplitude can be decreased in response to the detected result.

2. An ignition timing control system for an engine, comprising:
    an oscillator for oscillating periodic signals of a predetermined cycle;
    an ignition timing changing circuit for changing the ignition timing by a predetermined cycle in response to a signal from said oscillator;
    a gap sensor for detecting the displacement of vibrations of the engine block caused by an output signal from said ignition timing changing circuit;

a filter for extracting signals of necessary frequencies from the outputs of said gap sensor;

a waveshape rectification-integration circuit for half-wave rectifying and integrating the output signals from said filter;

a differential amplification circuit for calculating the component of change of an output signal from said waveshape rectification-integration circuit;

a differentiation circuit for differentiating an output signal from the ignition timing control circuit;

a monostable circuit for discriminating the sign of plus or minus of an output from said differentiation circuit;

a flipflop actuated by an output from said monostable circuit and an output from said oscillator;

an inverting amplifier for supplying an output from said differential amplification circuit or an inverted output therefrom in response to an output from said flipflop; and an updown counter for counting up or down in response to an output from said inverting amplifier and an output from said oscillator.

3. An ignition timing control system in an internal combustion engine, comprising:

ignition timing changing means for emitting a signal to alternately advance and delay an ignition timing from a reference ignition timing at a predetermined frequency;

engine vibration detecting means for detecting vibrations of the engine and emitting a vibration signal;

vibration increase-decrease discriminating means for seeking an amplitude of said vibration signal in a frequency zone substantially at said predetermined frequency, and judging whether said amplitude is on the increase or the decrease; and ignition timing controlling means for adjusting said reference ignition timing in response to the result of said judgment so that said amplitude can be decreased, and controlling the ignition timing in response to an output signal from said ignition timing changing means so that the ignition timing can be changed by said predetermined frequency.

4. An ignition timing control system for an engine as set forth in claim 3, wherein said engine vibration detecting means comprises a gap sensor disposed adjacent a block of said engine.

5. An ignition timing control system for an engine as set forth in claim 3, wherein said ignition timing changing means comprises an oscillator for generating periodic signals at said predetermined frequency and an ignition timing changing circuit for changing the ignition timing at said predetermined frequency in response to an output from said oscillator.

6. An ignition timing control system for an engine as set forth in claim 3, wherein said vibration increase-decrease discriminating means comprises:

a filter connected to said vibration detection means for extracting signals in the range of said predetermined frequency;

a waveshape processing circuit for supplying the mean or maximum value of the output of said filter;

a sample hold circuit for performing sampling of the signal values obtained by said waveshape processing circuit in synchronism with the output from said oscillator; and a vibration increase-decrease discriminating circuit for discriminating increase or decrease in the amplitude of vibrations based on an output from said sample hold circuit.

7. An ignition timing control system for an engine as set forth in claim 5 or 3, wherein said vibration increase-decrease discriminating means is connected to said ignition timing setting means for carrying out calculation of the preset ignition timing from a determining signal supplied by the vibration increase-decrease discriminating means and a signal supplied by said ignition timing control means.

* * * * *